United States Patent [19]

Siwersson et al.

[11] 4,095,015

[45] June 13, 1978

[54] GALVANIC PROCESSES AND ANODES FOR CARRYING THE PROCESSES INTO EFFECT

[75] Inventors: Olle Lennart Siwersson, Helsingborg; Arne Evert Wall, Landskrona; Olle Nilsson, Lund, all of Sweden

[73] Assignee: AB S. T. Powercell, Helsingborg, Sweden

[21] Appl. No.: 710,643

[22] Filed: Aug. 2, 1976

Related U.S. Application Data

[63] Continuation of Ser. No. 594,093, Jul 8, 1975, abandoned.

[30] Foreign Application Priority Data

Jul. 15, 1974 Sweden .................................. 7409209

[51] Int. Cl.² ............................................. H01M 8/20
[52] U.S. Cl. ..................................................... 429/15
[58] Field of Search ........................ 429/13, 14, 15, 40

[56] References Cited

U.S. PATENT DOCUMENTS

| | | | |
|---|---|---|---|
| 3,095,331 | 6/1963 | Davis | 429/50 |
| 3,294,586 | 12/1966 | Le Duc | 429/13 |
| 3,811,952 | 5/1974 | Siwersson et al. | 429/10 |

Primary Examiner—John H. Mack
Assistant Examiner—H. A. Feeley
Attorney, Agent, or Firm—Karl W. Flocks

[57] ABSTRACT

A galvanic primary cell in which complexing agents are supplied to the anode and/or the cathode to eliminate operation-inhibiting or passivating phase interfaces, such as a passivating coating on the anode or a heterogeneous supply of active material inhibiting the cathode reaction. More particularly, in an iron/air cell, complexing agents for iron are supplied to eliminate coatings on the Fe-anode, while complexing agents for oxygen are supplied to reversibly dissolve $O_2$ at the cathode.

9 Claims, 3 Drawing Figures

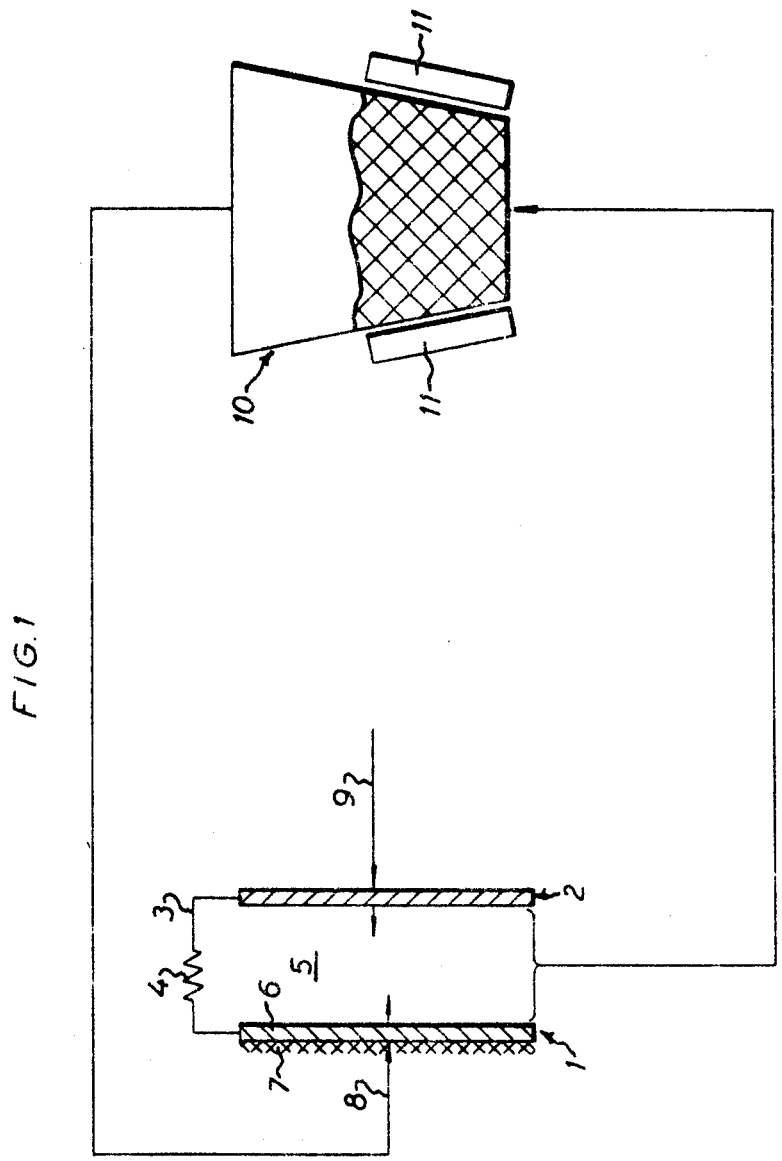

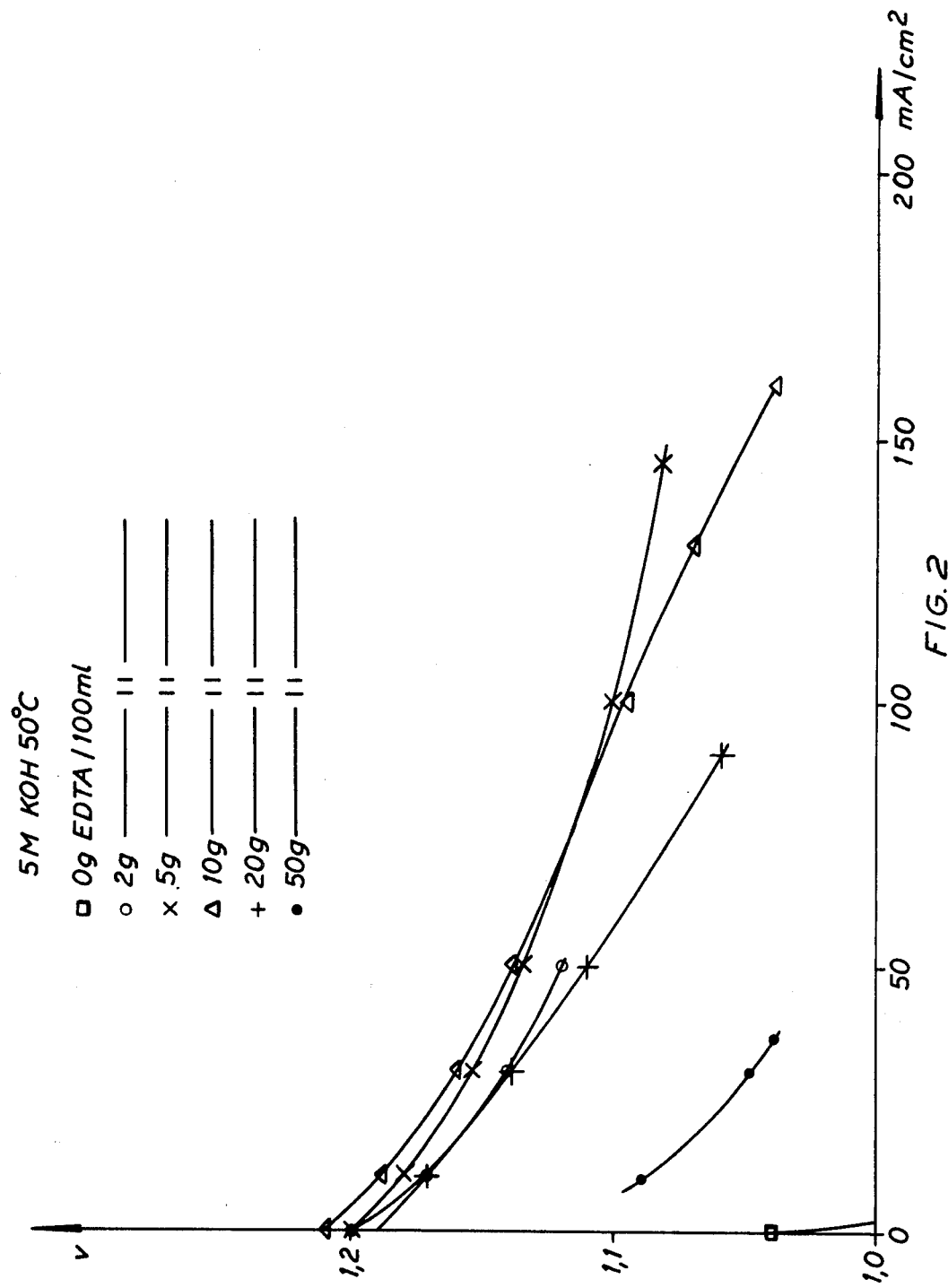

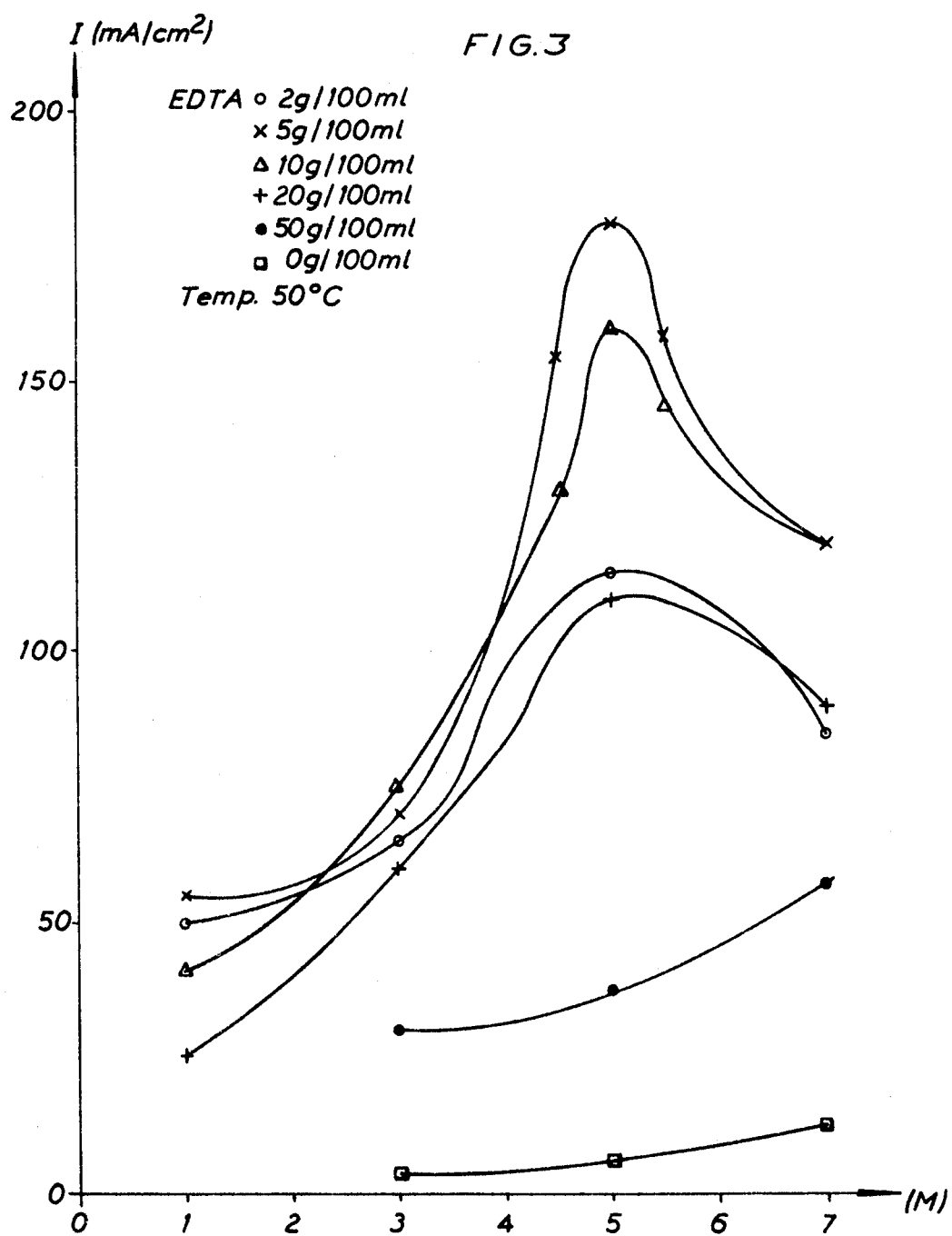

GALVANIC PROCESSES AND ANODES FOR CARRYING THE PROCESSES INTO EFFECT

This is a Continuation Application of applicant'pending application Ser. No. 594,093, filed July 8, 1975, now abandoned.

The invention relates to a galvanic process and to an anode for carrying the process into effect. More particularly, the invention relates to an improvement of the operation of a galvanic primary cell by the elimination of operation-inhibiting or passivating phase interfaces at the electrodes. The invention also provides a special anode for carrying the process into effect.

Problems are often associated with galvanic elements or cells containing an electrode of metal, since the reaction products being formed in the electrode process tend to be precipitated or remain on the electrode, for instance as metal oxides or metal hydroxides, whereby the electrode is passivated and the effectivity of the cell is diminished.

The problem is a very pronounced one in metal/air or metal/oxygen cells in which the anode is of iron and the electrolyte is an alkali solution, such as an NaOH or KOH solution, because the iron ions formed at the anode are precipitated or remain on the anode in the form of a coating which heavily reduces or precludes the continued function of the anode.

An issue of great interest therefore is to prevent in some way the formation of the above mentioned coating on the electrode to thereby ensure a steady and effective function of the electrode.

With regard to the mechanism of the formation of the passivating coating on the electrode, it is known, for some simple cases, such as with anodes of zinc and cadmium in alkaline electrolyte, that the metal at the electrode reaction is dissolved prior to the precipitation of the reaction-inhibiting coating. Intermediate forms arising at the anode and being of the type $An(OH)^+$ and $Cd(OH)^+$, respectively, can continue reacting with $OH^-$ according to $$Zn(OH)^+ + OH^- \rightarrow Zn(OH)_2$$

and $$Cd(OH)^+ + OH^- \rightarrow Cd(OH)_2,$$

respectively, and the inhibition of the reaction occurs only when the solubility product for the respective metal hydroxide has been exceeded. The intermediate forms can also yield a passivating oxide according to $$Zn(OH)^+ \rightarrow ZnO + H^+$$

and $$Cd(OH)^+ \rightarrow CdO + H^+,$$

respectively.

When the solubility is moderately exceeded, that is, at low supersaturation, the rate of precipitation increases as the supersaturation increases. At a high supersaturation the rate of nucleation is high compared to the rate of the growth of the nuclei, and the precipitation is inhibited. This is very customary with hydroxides having a low solubility product. Any method which at low supersaturation leads to a decrease of the concentration of such intermediary hydroxide complex forms, thus involves a lesser risk of precipitation on the electrode surface. At a high supersaturation, however, a decrease of the concentration involves that the rate of precipitation increases. In the case of zinc or cadmium the formation of a reaction-inhibiting precipitation on the anode is delayed by vigorous agitation, and at continuous supply of flowing fresh electrolyte an inhibition is entirely prevented.

For most other metals, including iron, this simple process is not sufficient for an elimination of reaction inhibitions which are due to the formation of such coatings. Besides, the passivation usually arises already before the galvanic cell is put into operation. The difference may be due to the respective solubility products being much lower, or to the fact that the reaction mechanisms in the dissolution and passivation of the metal in question are different from those for zinc and cadmium. As a matter of fact, passivating coatings on electrodes of iron or of other metals, which give passivating coatings of a type corresponding to that for iron cannot, however, be eliminated in the same simple manner as has been described above for zinc and cadmium, and, as far as is known, no simple and effective solution has been found to this problem before the present invention came into being.

In addition to the problem of passivating coatings discussed above, a further problem is associated with metal/air or metal/oxygen cells, which is that of supplying air or oxygen to the cathode. In conventional electrodes of this type, air is supplied, usually under pressure, to the cathode where the oxygen is reduced in the presence of a catalyst under formation of hydroxide ions in the electrolyte. The effectivity of the reduction of the oxygen at the cathode, that is, the cathode reaction, is limited at high current density by the rate at which the oxygen is able to diffuse into the active surface of the cathode, that is, by the transport of the oxygen. The oxygen transport and the cathode reaction are inhibited by the oxygen being present in the gaseous phase, while the electrolyte is liquid and the electrode solid. To improve the electrode reaction of the cathode it is desirable to make the oxygen transport more effective by an increased flow of oxygen, such as an increased supply rate of the oxygen or an increased concentration of the oxygen supplied.

A further special problem inherent in oxygen electrodes for metal/air cells is their complicated and critical construction which to an essential degree is due to the fact that the reduction of the oxygen at the cathode reaction is a three-phase reaction (gaseous oxygen, liquid electrolyte and solid electrode), and that the three-phase interface must be steadily maintained. To this end, the conventional oxygen cathodes are made porous, the pores having precisely selected dimensions, and moreover, the surfaces of the electrodes are made hydrophobic at least on the gaseous side and/or a counter-pressure is placed on the gaseous side. It goes without saying that such oxygen cathodes are difficult and expensive in manufacture and that it would imply a considerable simplification and improvement if the oxygen could be supplied in concentration, dissolved in a liquid, in which case it would not be necessary to maintain a three-phase interface, and moreover, other problems would be eliminated, such as the nitrogen present in the air and tending to poison the catalyst material in conventional oxygen cathodes.

It will clearly appear from the above outline that there are essential problems associated both with passivating coatings on iron type electrodes and with the oxygen supply to oxygen electrodes. Both of these problems stem from the passivating or inhibiting phase interfaces at the electrodes.

The object of the present invention therefore is to eliminate such passivating or inhibiting phase interfaces, which, to put it briefly, is realized by complexing, with the aid of complexing agents, the substance which gives rise to the passivating or inhibiting phase interfaces, and dissolving said substance.

More specifically, the invention provides a galvanic process in the operation of a galvanic primary cell which comprises an electrolyte and two electrodes consisting of an anode and a cathode which are interconnected via an outer circuit for tapping electric energy, phase interfaces occurring at at least one of the electrodes which interfaces inhibit the operation of the electrode. The invention comprises contacting the electrode when the phase interfaces are formed by an operation-inhibiting electrode coating which includes an electrode product formed during operation, with a first complexing agent which, in operation, is able at least partially to dissolve such an inhibiting electrode coating, and contacting the electrode when the phase interfaces are produced by heterogenous supply of active material which is consumed at the electrode, with a second complexing agent which, in operation, is able to reversibly dissolve such active material.

These and further characteristic features of the process will appear from the following and from the appended claims.

The invention also relates to the provision of an anode for carrying the above process into effect. This anode comprises an electrically conductive porous electrode body with a front and a back, the front being intended to contact the electrolyte in an electrolyte chamber, while the back is provided with active material which is consumed at the anode process and which is adherently held to the electrode body by magnetic forces. Apart from the advantages associated with magnetic adhesion of the active anode material to the electrode body, it is of particular advantage to arrange the active anode material on the back of the electrode body, since this will eliminate the risk of short circuiting which must be taken into account when the active material is arranged at the front, especially when the anode and the cathode are spaced but a small distance apart.

According to specifically preferred embodiments, the active anode material is iron and the pores of the electrical body are of such a dimension as to prevent the passage of the active anode material but allow the passage of the electrolyte and complexed ions of the active anode material.

As indicated above, in practising the invention, a first complexing agent is supplied to the anode to complex the reaction product formed in the electrode process, whereby a passivating coating is prevented from forming on the anode. Likewise, a second complexing agent for the active material at the cathode (the oxygen) is supplied at the cathode, for instance in a metal/air or metal/oxygen cell. More specifically, the invention implies with regard to an oxygen cathode that the oxygen is complexed and brought into soluble form by means of suitable complexing agent which selectively dissolves oxygen from the air, and that the oxygen is supplied to the cathode in the liquid phase, dissolved in the complexing agent or in a liquid composition containing the complexing agent. At the cathode the oxygen is again released from the complexing agent and undergoes the ordinary electrode reactions. By causing the liquid containing the dissolved oxygen to flow about or preferably through the cathode, the "diffusion" or transport of the oxygen to the active surface of the cathode can be heavily increased compared to conventional oxygen cathodes where the only oxygen transport takes place by diffusion and no actual flow of oxygen occurs. Said liquid flow in the inventive process will also facilitate the transport of $OH^-$ ions from the cathode.

Moreover, the invention permits utilizing a simpler cathode construction than hitherto, since there are no longer three different phases but only two phases at the cathode (liquid phase, solid phase). The distance from the phase (the air) having the active material (the oxygen) to the active surface of the electrode will be less critical.

Finally, the invention also provides the advantage that poisonous substances, such as nitrogen, can be eliminated by the complexing agent dissolving only the oxygen.

Even though the invention will be described and exemplified hereinafter, for greater simplicity, with reference to particularly preferred active materials, that is, iron and oxygen, it will be realized that the invention is not restricted to these very materials, but that other suitable active materials are also useful. The complexing agent must of course be adapted to the active material used in each particular case, and such useful complexing agents being known, those skilled in the art will know which ones to use, without necessitating any comprehensive enumeration of such agents.

As mentioned in the foregoing, a preferred active material is iron which may wholly or partly form the anode. The term "active material" is here meant to imply that iron is the material that is consumed at the electrode process. Thus, the anode can be for instance an electrode body of another conductive material, such as an other metal, which is coated with the active material. The electrode body does not take part in the electrode reaction proper but only serves to support the active material, that is, the iron, and to carry away by its electric conductivity the electrons partaking in the electrode reaction. At the actual electrode process the iron is transformed into iron ions which according to the invention are complexed with a complexing agent suitable for iron, preferably ethylene diamine tetraacetic acid (EDTA). As examples of other suitable complexing agents mention may be made of cyanide ($CN^-$), thiocyanate ($SCN^-$), citrate, nitrilotriacetate, ammonia, ethylene diamine tetrapropionic acid or diethylene triamine pentaacetic acid.

In a particularly preferred embodiment, the anode is part of a metal/air or metal/oxygen cell which apart from the anode comprises an electrolyte chamber containing an electrolyte, and a cathode or oxygen electrode which is electrically conductive and porous and is supplied with air or oxygen on its side opposite to the electrolyte chamber. As examples of suitable complexing agents for the active material at the cathode mention may be made of mono- or polynuclear aromatics with two or more electron-donating atoms in the rings or in functional groups bound to the rings, such as hyroxyquinolines, multivalent phenols, amino phenols, or their oxidation products. Among multivalent phenols mention may be made especially of hydroquinone, pyrocatechol, pyrogallol or their oxidation products.

Non-aromatics which form reversible complexes with oxygen are also useful.

For a better understanding, the invention will be described for purposes of illustration rather than limitation with reference to such a metal/air cell. In the drawings:

FIG. 1 schematically shows the metal/air cell;

FIG. 2 shows the voltage as a function of the current density; and

FIG. 3 shows the current density as a function of the liquor concentration at different contents of complexing agent.

The metal/air cell shown consists of an anode 1 and a cathode 2 which are interconnected by an electric line 3 having a resistor 4 for tapping of electric energy formed in said cell. The electrodes are spaced apart so as to form an electrolyte chamber 5 between them.

Upon supply of complexing agent only to the anode the oxygen electrode was a conventional oxygen electrode which was formed by a porous plate of sintered nickel and silver. The anode consisted of an electrode body formed by a porous silver plate 6 which on its face remote from the electrolyte chamber carried iron powder 7 which constituted the active material of the electrode. The iron powder was held to the electrode magnetically by an electro magnet (not shown) disposed on the back of the oxygen electrode. The dimension of the pores of the silver plate is here critical only to the extent that they must not be so large as to let the iron powder freely pass. Use was made of a 4 molar potassium hydroxide solution an an electrolyte.

With the device described, an experiment was first made without the use of complexing agent, that is, not in accordance with the present invention. The electrolyte 5 was filled with electrolyte solution, and fresh electrolyte solution in the form of 4 molar potassium hydroxide solution was continuously supplied to the electrolyte chamber by feed of that face of the anode which was turned away from the electrolyte chamber, as indicated by the arrow 8 in FIG. 1. At the same time the corresponding amount of electrolyte solution was removed from the electrolyte chamber. The fresh electrolyte solution first passed through the layer or iron powder and then through the porous anode, whereupon it was introduced into the electrolyte chamber. At the same time the oxygen electrode connected to the anode was supplied with air, as shown by the arrow 9, whereby hydroxide ions were formed at the oxygen electrode. Because of the alkaline environment the iron ions produced hydroxide on the anode and no satisfactory function of the cell was obtained.

Then an experiment was made in accordance with the present invention, proceeding in the same way as has been described above but with the difference that the fresh electrolyte solution supplied to the electrolyte chamber was first admixed with 50 g EDTA per liter solution. The electrolyte solution took up the iron ions formed at the electrode reaction in the form of a complex with EDTA so that they were not precipitated on the metal anode. The complexed iron ions intead passed unimpededly through the porous anode and were carried into the electrolyte chamber, and only in said chamber was the iron precipitated in the form of iron oxide hydrate. As this precipitation was freely present in the solution and was not precipitated on the anode it could readily be removed with the electrolyte from the electrolyte chamber. It was also established that the precipitated iron oxide hydrate was ferrimagnetic, for which reason it could readily be removed magnetically from the electrolyte solution. The results obtained in making the experiment according to the invention are indicated in Table 1.

Table 1

| Temperature (°C) | Current density (mA/cm$^2$) | Cell voltage (mV) |
|---|---|---|
| 70 | 300 | 0 |
| 70 | 100 | 500 |

As an alternative, the above anode can be replaced by other types of anodes, in which case the above electrode body, that is, the porous silver plate, is a perforated or porous plate of an other material which is electrically conductive and magnetic, for instance a sintered plate of magnetic iron oxide and barium oxide provided with an electrically conductive layer. This will eliminate the above mentioned separate electromagnet, and the iron powder is held to the electrode body by its self-magnetism. In the embodiment described above the active material of the anode, that is, the iron powder, is disposed on the face of the electrode remote from the electrolyte chamber. This is not, however, necessary since the iron powder can also be disposed on the face of the electrode turned towards the electrolyte chamber. Moreover, the above described device consists of a single cell, but for practical purposes the device is preferable equipped with double-acting electrodes, that is, the anode shown has a corresponding electrode body also on the other side of the iron powder, said electrode body facing a further electrolyte chamber. In a corresponding manner, the oxygen electrode is equipped with a further porous plate of sintered nickel and silver, which faces a third electrolyte chamber. In this way, a battery of cells can be built up in a simple manner. In such a battery air is supplied to the oxygen electrodes in the space between the porous sintered plates of nickel and silver, while electrolyte solution and complexing agent are supplied to the iron powder in the space between the porous electrode bodies. According as the active material, that is, the iron powder, is spent, fresh iron powder can be supplied to the electrode bodies and magnetically held thereto. A specific system for this purpose is exhaustively described in U.S. Pat. No. 3,811,952, to which reference is here made. It is also realized that it is not necessary continuously to furnish the cell with electrolyte solution, complexing agent and/or active material, since the cell can also be in the form of a primary battery in which the metal electrode has been filled beforehand with iron powder and a sufficient amount of complexing agent to complex the iron ions formed by the iron powder.

In a further experiment the effect of the liquor concentration and the complexing agent concentration was studied in a metal/air cell according to the above, which comprised an anode of a porous sintered silver plate with a perforated magnet of iron oxide and barium oxide, iron powder being held by magnetic forces to the face of the anode remote from the electrolyte chamber. The cathode was a sintered plate of nickel and silver. To the face of the cathode remote from the electrolyte chamber air was supplied at a pressure of 0.1 to 0.5 atm. The anode and the cathode each had an area of 2 cm$^2$. The electrolyte was KOH with a varying addition of EDTA as complexing agent, and the electrolyte was allowed to pass through the cell at a flow of about 20 ml per min. The cell was placed in a heating box for holding the temperature constant at 50° C. The current-voltage curve of the anode was measured against a reference electrode (calomel electrode) in the cell. FIG. 2 shows the current-voltage curve of the cell at different concentrations of complexing agent (EDTA). It will appear from the Figure that the current-voltage curve upon addition of an increasing concentration of EDTA was first improved in order to reach an optimum value at about 5 g EDTA per 100 ml electrolyte (5 M KOH). Then the current density of the cell sinks at a certain voltage upon further addition of EDTA, so that at 50 g EDTA per 100 ml electrolyte the value of the current density at a certain voltage is lower than at an addition of 2 g EDTA per 100 ml electrolyte. It is obvious that under these conditions there is an optimum with regard to the concentration EDTA at about 5–10 g EDTA per 100 ml electrolyte.

The corresponding conditions are also evident from FIG. 3 which shows the current density as a function of the electrolyte concentration at different concentrations of complexing agent (EDTA). The lowermost curve shows the conditions without any addition of complexing agent. Then the curves show that an increasing concentration of EDTA gives an increasing current density up to a concentration of about 5–10 g EDTA per 100 ml electrolyte. At a further increase of EDTA concentration the current density again sinks so that relatively low current density values are obtained at a concentration of 50 g EDTA per 100 ml electrolyte. They are nevertheless higher than the values obtained without any addition of complexing agent.

It further appears fron FIG. 3 that the current density shows a relatively strong dependency on the electrolyte concentration. This dependency is not as pronounced at a lack of complexing agent, whereas the current density at an optimum addition of complexing agent, that is, about 5–10 g per 100 ml, varies so much as about 125 mA/cm$^2$ at varying electrolyte concentrations. It will appear from the curves that the optimum value of the electrolyte concentration lies at about 5 moles KOH per liter.

Finally, an experiment was also made to investigate the effect of a supply of complexing agent to the oxygen electrode. In this experiment use was made of the above device and the electrolyte was 5 M KOH to which had been added 5 g EDTA per 100 ml electrolyte. Instead of supplying air under pressure to the oxygen electrode at the face thereof remote from the electrolyte chamber, the above mentioned electrolyte was supplied to it. This electrolyte had been mixed with pyrogallol complexed with oxygen. The oxygen was supplied complexed in the liquid phase, and not in the gaseous phase. A satisfactory function of the cell was established. The best result was obtained with use of a porous cathode where the oxidized electrolyte was allowed to pass through the electrode.

Pyrocatechol was also tested as a complexing agent for oxygen and with the use of a graphite cathode gave a higher short circuiting current than pyrogallol. Hydroquinone and ascorbic acid took an intermediate position.

In the above mentioned embodiment where iron is used as active material for the anode the iron complexed in the electrode process was precipitated in the electrolyte in the form of magnetic iron oxide hydrate which can be separated from the electrolyte and recovered in a specific way which will be described hereinbelow.

As shown in FIG. 1, electrolyte is withdrawn from the cell to a container 10. The electrolyte contains magnectic iron oxide hydrate which has been precipitated from the complexed iron. When the electrolyte solution enters the container 10 the magnetic iron oxide hydrate is separated by means of the magnets 11. Should the precipitation of iron oxide hydrate be incomplete the solution in the container is grafted with crystals of magnetic iron oxide, preferably under agitation of the solution. When all iron oxide material in the solution has been separated, the purified solution is withdrawn from the container and can, if desired, be returned to the metal/air cell illustrated in FIG. 1. It should be mentioned that at the separation in the container 10 the gradually increasing layer of iron oxide hydrate will act as a filter for the impure electrolyte which is supplied to the container, whereby the cleaning of the electrolyte will be more effective.

What we claim and desire to secure by Letters Patent is:

1. A process of counteracting the formation of a passivating anode coating in the operation of a galvanic primary cell comprising an alkaline electrolyte, an anode, a cathode and an electrolyte chamber therebetween which are interconnected via an outer circuit for tapping electric energy, the active material of the anode consisting essentially of iron, particularly iron powder, while the cathode is an oxygen or an air electrode, comprising supplying oxygen in liquid complexed form obtained by complexing oxygen with an oxygen complexing agent which is an aromatic compound, and complexing the iron ions formed at the anode with a complexing agent for iron ions.

2. A process as claimed in claim 1, wherein the iron complexing agent is supplied to the electrolyte.

3. A process as claimed in claim 1, wherein said iron complexing agent is selected from the group consisting of cyanides, thiocyanates, citrates, nitrilotriacetate, ammonia, ethylene diamine tetraacetic acid, ethylene diamine tetrapropionic acid and diethylene triamine pentaacetic acid.

4. A process as claimed in claim 3, wherein the iron complexing agent is ethylene diamine tetraacetic acid.

5. A process in accordance with claim 4, wherein said electrolyte comprises 5–10 grams of ethylene diamine tetraacetic acid per hundred mililiters of electrolyte.

6. A process as claimed in claim 1, wherein the active iron material of the anode is held to the anode by magnetic forces.

7. A process as claimed in claim 6, wherein the anode is a magnetic electrically conductive porous electrode body with a front and a back, the front being in communication with the electrolyte in an electrolyte chamber, while the active anode material is disposed on the back of the electrode body and the iron complexing agent is supplied to the active material through the back.

8. A process according to claim 1, wherein the oxygen complexing agent is a member of the group consisting of hydroquinolines, multivalent phenols, aminophenols and their oxidation products.

9. A process according to claim 1, wherein the oxygen complexing agent is a member of the group consisting of hydroquinone, ascorbic acid, pyrocatechol, pyrogellol and their oxidation products.

* * * * *